UNITED STATES PATENT OFFICE.

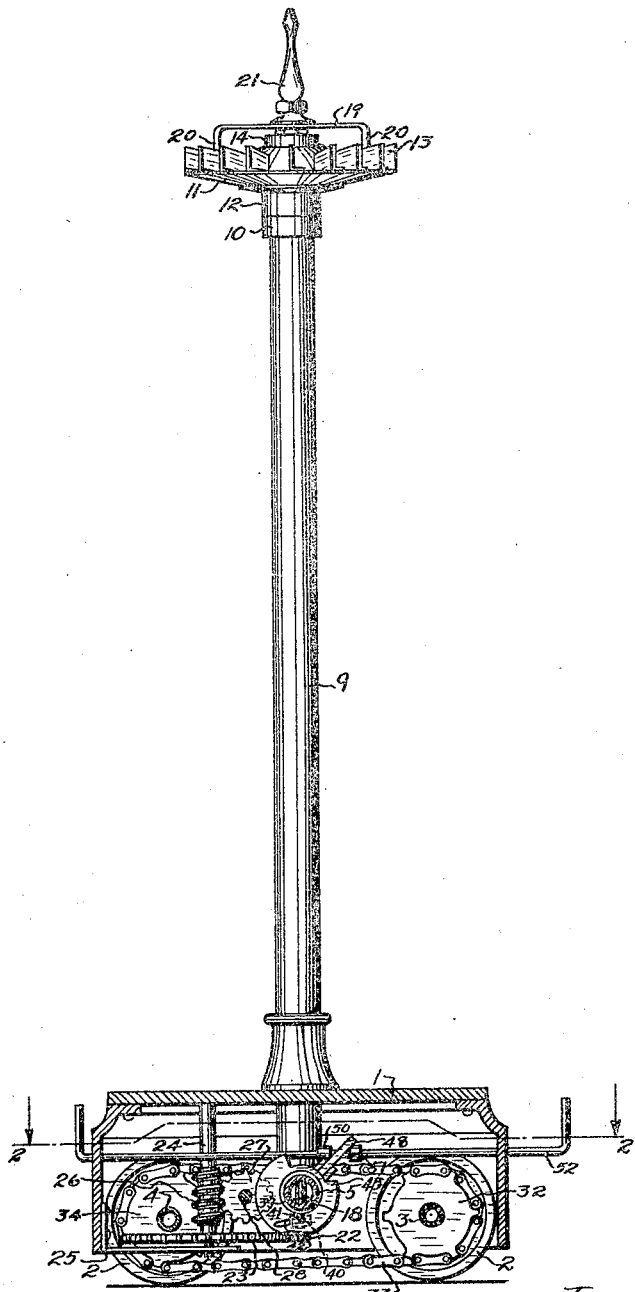

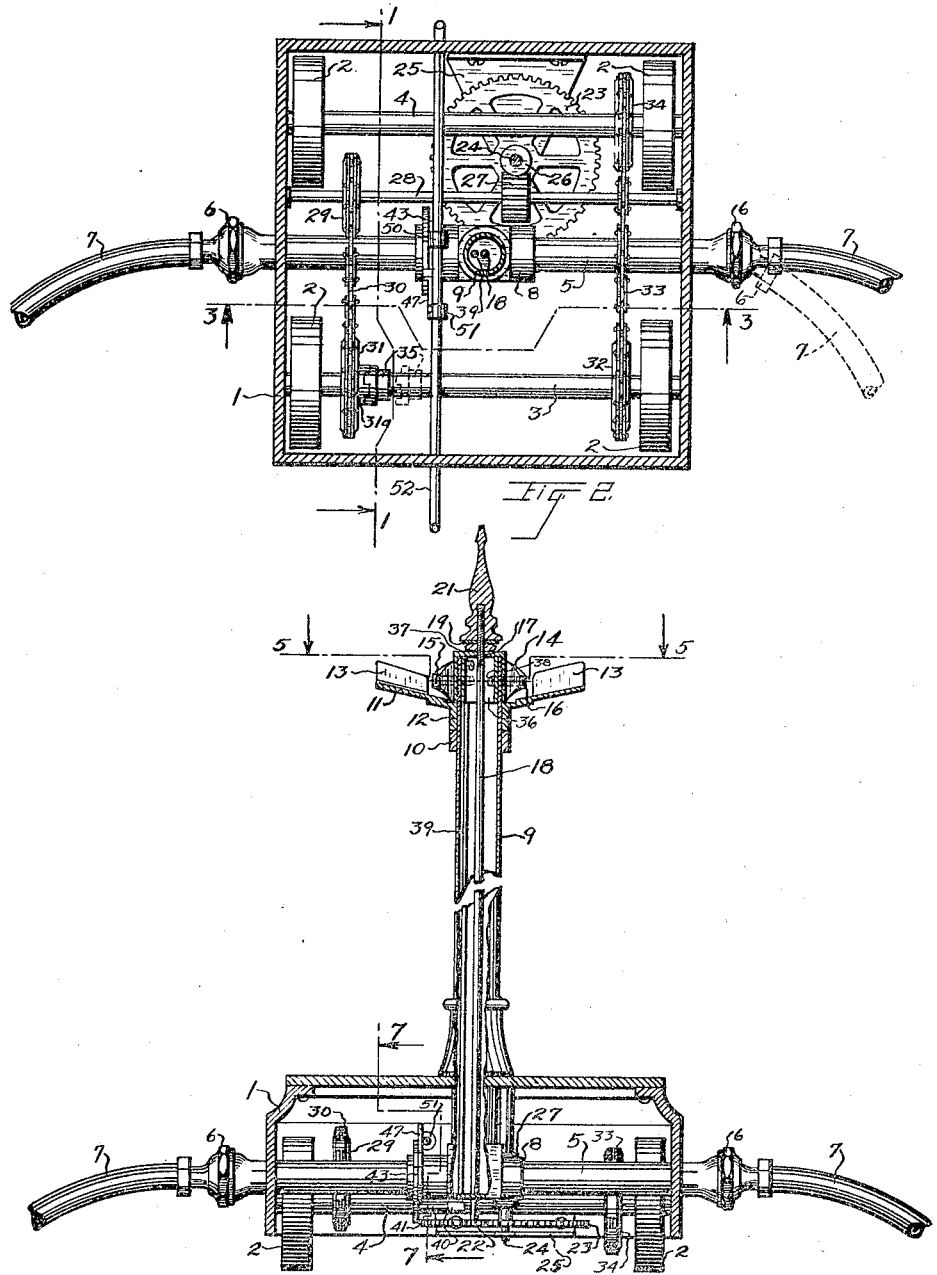

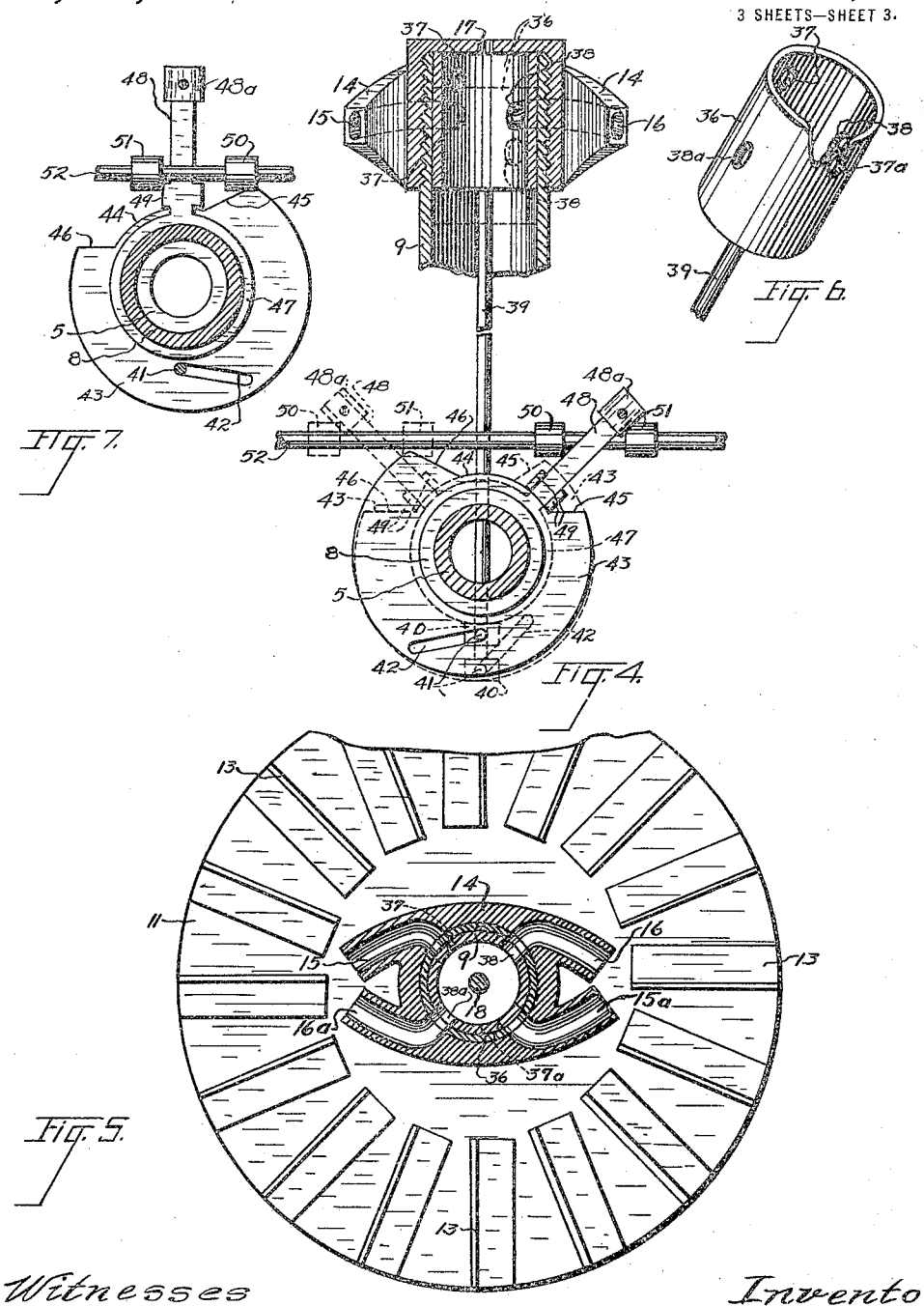

ERIK JOHNSON, OF CHICAGO, ILLINOIS.

TRAVELING LAWN-SPRINKLER.

1,375,296.      Specification of Letters Patent.      Patented Apr. 19, 1921.

Application filed April 12, 1919. Serial No. 289,618.

*To all whom it may concern:*

Be it known that I, ERIK JOHNSON, a citizen of the United States, residing at Chicago, in the county of Cook and State of Illinois, have invented certain new and useful Improvements in Traveling Lawn-Sprinklers, of which the following is a specification.

This invention relates to improvements in traveling lawn sprinklers of a class wherein the water is directed against a number of blades of a water wheel to rotate it and thereby drive gearing that is connected to the supporting wheels which are thereby rotated, means being provided for reversing the direction of rotation when desired, the said blades serving to break and spray the streams of water at the same time thereby watering or sprinkling the lawn in a thorough manner. The invention consists in the combination and arrangement of parts to be hereinafter fully described, pointed out in the appended claims and illustrated in the accompanying drawings which form a part of this specification and in which—

Figure 1 is a view of my improved traveling lawn sprinkler in side elevation and partly in section taken on line 1—1 of Fig. 2.

Fig. 2 is a cross section taken on line 2—2 of Fig. 1.

Fig. 3 is a vertical sectional view taken substantially on the line 3—3 of Fig. 2.

Fig. 4 is an enlarged fragmentary view of the reversing mechanism.

Fig. 5 is an enlarged fragmentary sectional view taken on line 5—5 of Fig. 3.

Fig. 6 is a fragmentary view in perspective of Fig. 4 illustrating the slide valve employed.

Fig. 7 is a vertical sectional view taken on line 7—7 of Fig. 3.

Like reference characters denote corresponding parts throughout the several views.

The reference numeral 1 denotes a housing carried upon the traction wheels 2 which are fast upon the axles 3, 4 journaled in the housing. A water pipe 5 extends through the housing 1 parallel to the axles 3, 4 and between the same, the ends of said water pipe being connected by flexible joints 6 to the rubber hose 7 connected direct to the water main. The water pipe 5 is connected by an inverted T-coupling 8 to a standpipe 9 that extends through the casing 1 and that is provided adjacent its upper end with a collar 10, the upper end being threaded. A horizontally disposed water wheel 11 is provided with a hub 12 that encircles the standpipe and rests upon the collar 10, said wheel being thereby supported, said wheel being provided with the spaced wings 13, said wings being spaced from the wheel center, toward which they converge, to form clearance for the threaded head 14 which is formed with two pairs of nozzles 15, 15$^a$ and 16, 16$^a$, the members of each pair of nozzles being disposed diametrically opposite each other. The head 14 is formed with a central perforation 17 that is threaded to receive the end of a rotary rod 18 which extends entirely through the standpipe and at its upper end carries the tie bar 19 the bifurcated ends 20 of which engage with the wings 13 and an interiorly threaded cap 21 disposed upon said tie bar. The said rod 18 extends through the T-coupling 8 and at its lower end carries a pinion 22 in mesh with a large gear 23 the axis 24 of which depends from the housing 1 and is journaled in a bearing 25 secured to one side of the housing, said axis 24 being formed with the worm 26 in mesh with a gear 27 fast upon a transmission shaft 28, parallel to the pipe 5 and journaled in the sides of the casing 1, said shaft 28 also carrying a sprocket wheel 29 connected by a sprocket chain 30 to another sprocket wheel 31 fast upon a clutch section 31$^a$ loose upon the axle 3, said axle being provided also with a sprocket wheel 32 that is connected by sprocket chain 33 to a sprocket wheel 34 of axle 4. Keyed to the said axle 3 is the sliding clutch section 35, manually operated, to permit movement of the device over the lawn without movement of the gearing when desired, as when transporting the device from place to place.

Within the standpipe 9 at its upper end is a slide valve 36 of cylindrical formation that fits snugly and that is formed with two pairs of perforations 37, 37$^a$ and 38, 38$^a$, the perforations 38, 38$^a$ being adapted, in the raised position of the valve shown in Fig. 4, to register with the perforations 16, 16$^a$ in the head and with alined perforations in the standpipe; the perforations 37, 37$^a$ being adapted to register with the perforations 15, 15$^a$ in the head and with alined perforations in the standpipe when the slide valve is dropped, said slide valve being engaged by a pitman 39 extending down through the standpipe and through the T-coupling and terminally carrying a block 40 that carries a pin 41 disposed in an oblique slot 42 formed in a rock disk 43 carried by the pipe 5, said disk being formed with a recess 44 in its periphery, said recess being bounded by the disk-shoulders 45, 46. Lying flat against the disk 43 is a ring 47 that encircles the pipe 5 and that is formed with a finger 48 provided with a weight $48^a$ and laterally with the wings 49 adapted to engage with the recessed portion of the disk 43, said finger being disposed between a pair of spaced lugs 50, 51 of a shift rod 52 extending through the casing 1 at right angles to the axles 3, 4 so that the ends of said rod are disposed in front and in back of the casing.

In operation the water from the hose pipes 7 is forced up through the standpipe 9 and, in the raised position of the slide valve shown in full lines in Fig. 4, out through the perforations 38, $38^a$, 16, $16^a$ against the blades 13 rotating the same in one direction thus rotating the rod 18 which through the medium of pinion 22 drives the gear 23 that drives the worm 26 that rotates the gear 27 that by means of sprocket chain and wheels drives the axles 3, 4 thus impelling the machine in one direction over the lawn, the water being sprayed by the said wings 13. A cord or line (not shown) is drawn across the ends of the lawn at such a height from the ground that the shaft rod 52 will encounter the same and be moved thereby longitudinally of the casing 1 thus causing the lugs 50, 51 to shift the finger 48 from one side of the pipe 5 to the other as clearly shown in Fig. 4. This movement will so shift the disk 43 as to drop pin 41 to the lower end of the oblique slot 42 thus dropping the slide valve 36 to the position shown dotted in Fig. 4 when the water from the standpipe will pass out through the nozzles 15, $15^a$ thus striking the wings 13 in a manner to reverse the movement of the wheel 11 thus reversing the movement of all the gearing and consequently reversing the motion of the device and causing it to travel back over the lawn, again sprinkling the same. Each time the machine reaches one end of the lawn the shift rod 52 encounters the cord drawn across the lawn and reverses the mechanism in the manner described thus causing the machine to travel back again.

What is claimed is:—

1. In a traveling lawn sprinkler, a wheeled casing, axles for said wheels journaled in said casing, a water pipe carried by said casing, a water wheel, having spaced inwardly converging blades, arranged upon said standpipe, a head carried by said standpipe and formed with two pairs of nozzles whereby water is directed from either pair upon said water wheel in either of two directions, the members of each pair of nozzles being disposed diametrically opposite each other, a rotary rod extending through said standpipe and water pipe, a tie bar connecting the blades of said water wheel and said rod, gearing connecting said rod and the wheel axles, a slide valve arranged in said standpipe for controlling the flow of water through one or the other of said pairs of nozzles, a shift rod carried by said casing for engagement and operation by an exterior object, and connection between said shift rod and slide valve.

2. In a traveling lawn sprinkler, a wheeled casing, axles for said wheels journaled in said casing, a water pipe carried by said casing, a water wheel, having spaced inwardly converging blades, arranged upon said standpipe, a head carried by said standpipe whereby water is directed therefrom upon said water wheel in either of two directions, a rotary rod extending through said standpipe and water pipe, a tie bar connecting the blades of said water wheel and said rod, gearing connecting said rod and the wheel axles, a slide valve arranged in said standpipe for controlling the flow of water through said head, a shift rod carried by said casing for engagement and operation by an exterior object, and connection between said shift rod and slide valve.

In testimony that I claim the foregoing as my own I have hereto affixed my signature in the presence of two subscribing witnesses.

ERIK JOHNSON.

Witnesses:
 AXEL B. ALDRIN,
 C. OLOF CARLSON.